US012404987B2

(12) United States Patent
Zhang et al.

(10) Patent No.: US 12,404,987 B2
(45) Date of Patent: Sep. 2, 2025

(54) LIGHT SOURCE MODULE

(71) Applicant: Qisda Corporation, Taoyuan (TW)

(72) Inventors: Jia-Ming Zhang, Taoyuan (TW); Ching-Tze Huang, Taoyuan (TW)

(73) Assignee: Qisda Corporation, Taoyuan (TW)

( * ) Notice: Subject to any disclaimer, the term of this patent is extended or adjusted under 35 U.S.C. 154(b) by 0 days.

(21) Appl. No.: 18/376,501

(22) Filed: Oct. 4, 2023

(65) Prior Publication Data

US 2024/0133537 A1 Apr. 25, 2024
US 2024/0230060 A9 Jul. 11, 2024

(30) Foreign Application Priority Data

Oct. 19, 2022 (CN) ........................ 202211280226.2

(51) Int. Cl.

*F21V 5/02* (2006.01)
*F21V 5/04* (2006.01)
*F21Y 113/10* (2016.01)

(52) U.S. Cl.

CPC .................. *F21V 5/02* (2013.01); *F21V 5/04* (2013.01); *F21Y 2113/10* (2016.08)

(58) Field of Classification Search

CPC .................................................. F21Y 2113/10
See application file for complete search history.

(56) References Cited

U.S. PATENT DOCUMENTS

| | | | | |
|---|---|---|---|---|
| 6,196,699 | B1 * | 3/2001 | Stanton | H04N 5/74 362/346 |
| 7,559,671 | B2 * | 7/2009 | Lee | G03B 21/2013 362/240 |
| 2008/0055903 | A1 * | 3/2008 | Akiyama | F21V 13/04 362/245 |
| 2015/0167932 | A1 | 6/2015 | Yamada et al. | |
| 2019/0113763 | A1 | 4/2019 | Kito | |
| 2020/0409247 | A1 * | 12/2020 | Miya | G03B 21/204 |
| 2021/0216004 | A1 | 7/2021 | Yasumatsu et al. | |
| 2022/0299856 | A1 | 9/2022 | Uchiyama et al. | |
| 2023/0135388 | A1 | 5/2023 | Chien et al. | |

FOREIGN PATENT DOCUMENTS

| | | | |
|---|---|---|---|
| JP | H1195171 A | * | 4/1999 |
| JP | 3986136 B2 | * | 10/2007 |

* cited by examiner

*Primary Examiner* — Fatima N Farokhrooz

(57) ABSTRACT

A light source module includes a first light source, a second light source, a first reflective layer and a second reflective layer. The first light source is configured to emit a first light having a first wavelength. The second light source is configured to emit a second light having the first wavelength. The first reflective layer is disposed opposite to the first light source and configured to reflect the first light. The second reflective layer is disposed opposite to the second light source and configured to reflect the second light. The first reflective layer and the second reflective layer are configured to reflect light of any wavelength in a visible spectrum.

7 Claims, 4 Drawing Sheets

LIGHT SOURCE MODULE

This application claims the benefit of People's Republic of China application Serial No. 202211280226.2, filed on Oct. 19, 2022, the subject matter of which is incorporated herein by reference.

TECHNICAL FIELD

The disclosure relates in general to a light source module.

BACKGROUND

The light source module has a wide application, and many devices need the light source module, such as projectors, illuminator, flashlight, etc. Generally speaking, the optical components of the light source module may cause light loss due to factors such as assembly tolerances and spatial configurations. Therefore, proposing a new light source module capable of reducing light loss is one of the goals of the industry in this technical field.

SUMMARY

This disclosure proposes a light source module capable of improving the aforementioned conventional problems.

According to an embodiment of the present invention, a light source module is proposed. The light source module includes a first light source, a second light source, a first reflective layer and a second reflective layer. The first light source is configured to emit a first light having a first wavelength. The second light source is configured to emit a second light having the first wavelength. The first reflective layer is disposed opposite to the first light source and configured to reflect the first light. The second reflective layer is disposed opposite to the second light source and configured to reflect the second light. The first reflective layer and the second reflective layer are configured to reflect light of any wavelength in a visible spectrum.

According to another embodiment of the present invention, a light source module is provided. The light source module includes a first light source, a second light source, a light-transmitting element, a first reflective layer and a light-splitting layer. The first light source is configured to emit a first light having a first wavelength. The second light source is configured to emit a second light having the first wavelength. The light-transmitting element has a first surface and a second surface. The first reflective layer is formed on the first surface and configured to reflect the first light. The light-splitting layer is formed adjacent to the second surface and configured to reflect the second light.

The above and other aspects of the disclosure will become better understood with regard to the following detailed description of the preferred but non-limiting embodiment(s). The following description is made with reference to the accompanying drawings.

DETAILED DESCRIPTION

Figure 1:
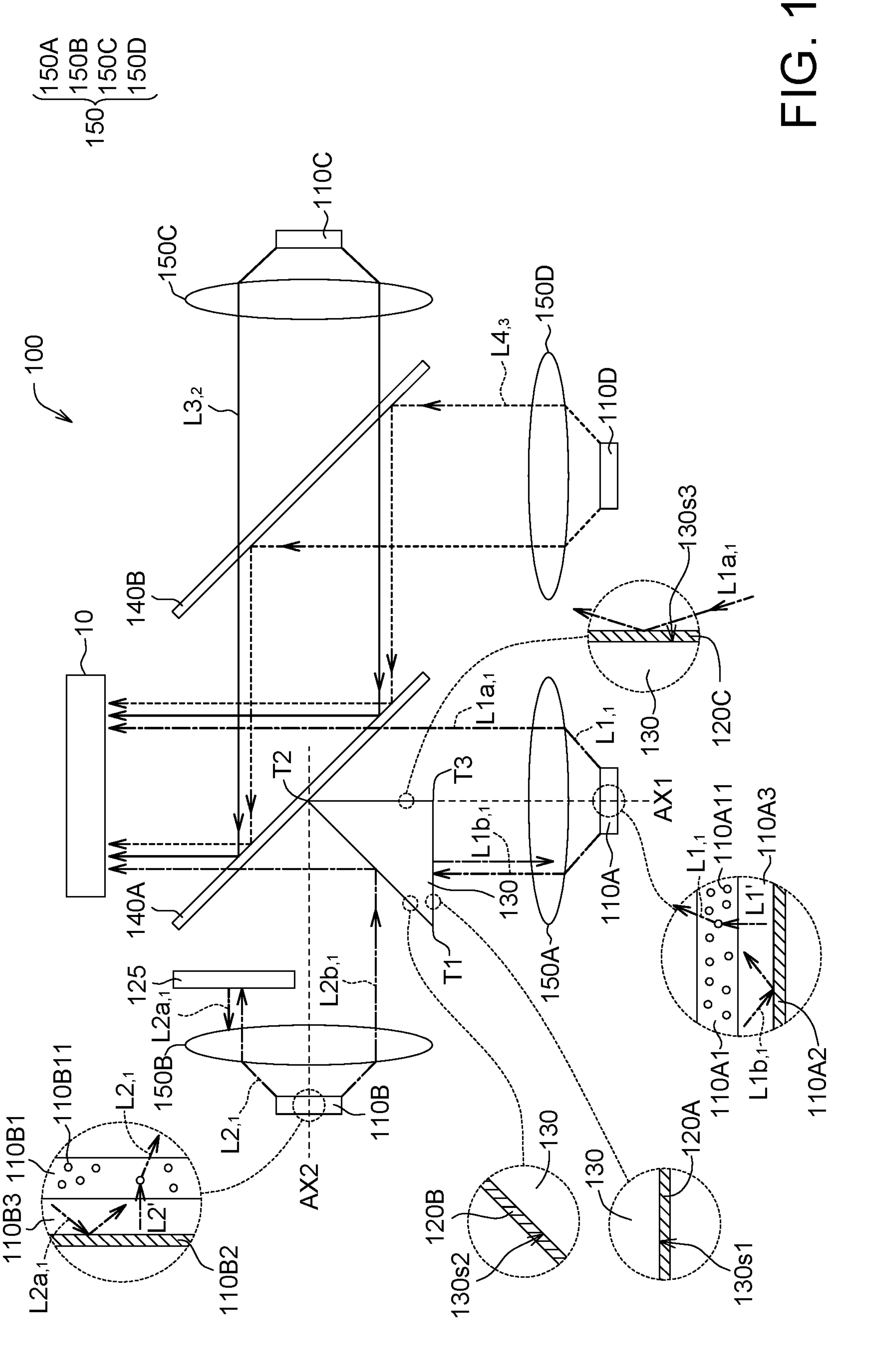
FIG. 1 shows a schematic diagram of an optical path of a light source module 100 according to an embodiment of the present invention.

Referring to FIG. 1, FIG. 1 shows a schematic diagram of an optical path of a light source module 100 according to an embodiment of the present invention. The light source module 100 could be applied to a device requiring a light source, such as a projector, illuminator, display or other types of devices. For application in the projector, the light source module 100 could also be called a light combining module.

As shown in FIG. 1, the light source module 100 includes a first light source 110A, a second light source 110B, a first reflective layer 120A, a second reflective layer 120B, a third reflective layer 120C, a first prism 130, a reflective element 125, a third light source 110C, a fourth light source 110D, a first light-splitting element 140A, a second light-splitting element 140B, at least one condenser lens 150 (for example, a first condenser lens 150A, a second condenser lens 150B, a third condenser lens 150C and/or a fourth condenser lens 150D).

As shown in FIG. 1, the first light source 110A is configured to emit a first light L1$_{,1}$ having a first wavelength (subscript "1" means "the first wavelength"). The second light source 1108 is configured to emit a second light L2$_{,1}$ having the first wavelength. The first reflective layer 120A is disposed opposite to the first light source 110A and configured to reflect the first light L1$_{,1}$. The second reflective layer 1208 is disposed opposite to the second light source 1108 and configured to reflect the second light L2$_{,1}$. The first reflective layer 120A and the second reflective layer 1208 are configured to reflect light of any wavelength in the visible spectrum. As a result, the first reflective layer 120A could reflect the first light L1$_{,1}$ back to the first light source 110A, and the second reflective layer 1208 could reflect the second light L2$_{,1}$ back to the second light source 1108 to reuse the reflected light and reduce light loss.

As shown in FIG. 1, the first light L1$_{,1}$ includes a first part L1*a*$_{,1}$ and a second part L1*b*$_{,1}$. The first part L1*a*$_{,1}$ and the second part L1*b*$_{,1}$ travel along two opposite sides of a first axis AX1 respectively. The first axis AX1 passes through a light-emitting surface of the first light source 110A and the first condenser lens 150A. For example, the first axis AX1 passes through a center of the first light source 110A and a center of the first condenser lens 150A. The first part L1*a*$_{,1}$ could travel through the first light-splitting element 140A, and the second part L1*b*$_{,1}$ is reflected from the first reflective layer 120A back to the first light source 110A for recycling.

As shown in FIG. 1, the first light source 110A further includes a first wavelength conversion layer 110A1, a first reflective layer 110A2 and a first light-emitting layer 110A3. The first light-emitting layer 110A3 is formed between the first wavelength conversion layer 110A1 and the first reflective layer 110A2, and the first wavelength conversion layer 110A1 is closer to the second reflective layer 1208 than the first reflective layer 110A2. The first light-emitting layer 110A3 includes, for example, at least one semiconductor epitaxial layer, which could emit a light L1'. In the present embodiment, the light L1' is, for example, light having the second wavelength or the third wavelength. The first wavelength conversion layer 110A1 includes several fluorescent particles 110A11, which could excite the light to convert the wavelength of the light. For example, the light L1' having the second wavelength or the third wavelength is converted into the first light L1,$_1$ having the first wavelength. The first reflective layer 110A2 could reflect the light back to the first wavelength conversion layer 110A1 to increase the wavelength conversion efficiency. In the present embodiment, the first reflective layer 110A2 could reflect the second part L1*b*,$_1$, and the reflected second part L1*b*,$_1$ is divided into two parts traveling along opposite sides of the first axis AX1 just like the aforementioned first light L1,$_1$.

As shown in FIG. 1, the second light L2,$_1$ includes a third part L2*a*,$_1$ and a fourth part L2*b*,$_1$. The third part L2*a*,$_1$ and the fourth part L2*b*,$_1$ travel along two opposite sides of a second axis AX2 respectively. The second axis AX2 travels through a light-emitting surface of the second light source 1106 and the second condenser lens 150B. For example, the second axis AX2 passes through the center (for example, the optical axis) of the second light source 1106 and a center of the second condenser lens 150B. The third part L2*a*,$_1$ could travel through the first light-splitting element 140A, and the fourth part L2*b*,$_1$ is reflected from the reflective element 125 back to the second light source 1106 for recycling.

As shown in FIG. 1, the second light source 1106 further includes a second wavelength conversion layer 110B1, a second reflective layer 110B2 and a second light-emitting layer 110B3. The second light-emitting layer 110B3 is formed between the second wavelength conversion layer 110B1 and the second reflective layer 110B2, and the second wavelength conversion layer 110B1 is closer to the reflective element 125 than the second reflective layer 110B2. The second light-emitting layer 110B3, for example, includes at least one semiconductor epitaxial layer, which could emit a light L2'. In the present embodiment, the light L2' is light having the second wavelength or the third wavelength, for example. The second wavelength conversion layer 110B1 includes several fluorescent particles 110B11 which could excite the light to convert the wavelength of the light. For example, the light L2' having the second wavelength or the third wavelength is converted into the second light L2,$_1$ having the first wavelength. The second reflective layer 110B2 could reflect the light back to the second wavelength conversion layer 110B1 to increase the wavelength conversion efficiency. In the present embodiment, the second reflective layer 110B2 could reflect the fourth part L2*b*,$_1$, and the reflected fourth part L2*b*,$_1$ is divided into two parts traveling along two opposite sides of the second axis AX2 just like the aforementioned second light L2,$_1$.

As shown in FIG. 1, the third light source 110C is configured to emit a third light L3,$_2$ having a second wavelength (subscript "2" means "second wavelength"). The third light L3,$_2$ could travel through the second light-splitting element 140B, be incident to the first light splitting element 140A, and then be reflected from the first light splitting element 140A to be incident to the module 10. The module 10 is, for example, an illumination module or an imaging module or light pipe.

As shown in FIG. 1, the fourth light source 110DC is configured to emit a fourth light L4,$_3$ having a third wavelength (subscript "3" means "third wavelength"). The fourth light L4,$_3$ is incident to the second light-splitting element 140B, reflected from the second light-splitting element 140B to the first light-splitting element 140A, and then reflected from the first light-splitting element 140A to be incident the module 10.

Light of different wavelengths has different light colors. In terms of light color, the aforementioned color light with the first wavelength is, for example, one of blue light (for example, the wavelength is between 450 nm and 495 nm), red light (for example, the wavelength is between 620 nm and 750 nm) and green light (The wavelength is, for example, one of 495 nm to 570 nm), wherein the color light having the second wavelength is, for example, another of the blue light, the red light and the green light, and the color light having the third wavelength is, for example, the other of the blue light, the red light and the blue light. In the present embodiment of the present invention, the color light having the first wavelength is the green light, the color light having the second wavelength is the red light, and the color light having the third wavelength is the blue light.

As shown in FIG. 1, the first reflective layer 120A and the second reflective layer 120B could reflect light of any wavelength in the visible spectrum. In other words, the first reflective layer 120A and the second reflective layer 120B do not allow the light of any wavelength in the visible spectrum to travel through. The first reflective layer 120A and the second reflective layer 120B are, for example, reflective mirrors, or the first reflective layer 120A and the second reflective layer 120B may exclude the light-splitting element.

As shown in FIG. 1, the third reflective layer 120C could reflect light of any wavelength in the visible spectrum. In other words, the third reflective layer 120C does not allow the light of any wavelength in the visible spectrum to travel through. The third reflective layer 120C is, for example, a reflective mirror, or the third reflective layer 120C may exclude a light-splitting element. The third reflective layer 120C could reflect the first part L1*a*,$_1$ of the first light L1,$_1$ (if the first part L1*a*,$_1$ is incident on the third reflective layer 120C).

As shown in FIG. 1, the reflective element 125 is disposed opposite to the second light source 1108. The reflective element 125 is disposed on a side of the second axis AX2 for reflecting the third part L2*a*,$_1$. In the present embodiment, the reflective element 125 may be a light diffraction (or refractive) element, such as a reflective mirror, a light-splitting element or the like. The reflective element 125 and the first prism 130 are respectively disposed on two opposite sides of the second axis AX2.

As shown in FIG. 1, the first prism 130 is disposed on a side of the first axis AX1 and/or on a side of the second axis AX2. The first reflective layer 120A and the second reflective layer 1208 are formed on the first prism 130. For example, the first prism 130 has a first surface 130*s*1 and a second surface 130*s*2. The first reflective layer 120A is formed on the first surface 130*s*1, and the second reflective layer 1208 is formed on the second surface 130*s*2. The first prism 130 has a polygonal cross section, such as a triangle. The first surface 130*s*1 and the second surface 130*s*2 are two adjacent or connecting surfaces of the first prism 130 respectively. In an embodiment, an included angle between the first surface 130*s*1 and the second surface 130*s*2 is, for example, 45 degrees, but it could also be greater or smaller.

As shown in FIG. 1, since the first prism 130, the first reflective layer 120A, the second reflective layer 1208 and the third reflective layer 120C form an integral structure which could move together, it is convenient to assemble in the light path space within the light source module 100. In addition, the first reflective layer 120A and the second reflective layer 120B could be connected to each other at an junction T1 between the first surface 130*s*1 and the second surface 130*s*2 of the first prism 130, and thus it could prevent a physical light-transmitting material of the first prism 130 from be exposed from the junction T1, thereby preventing the second light L2,$_{1}$ from traveling the first prism 130 to become light leakage (light loss). Similarly, the second reflective layer 120B and the third reflective layer 120C could be connected to each other at a junction T2 between the second surface 130*s*2 and a third surface 130*s*3 of the first prism 130, and thus it could prevent the physical light-transmitting material of the first prism 130 from be exposed from the junction T2, thereby reducing or preventing the (light leakage). Similarly, the first reflective layer 120A and the third reflective layer 120C could be connected to each other at a junction T3 between the first surface 130*s*1 and the third surface 130*s*3 of the first prism 130, and thus it could prevent the physical light-transmitting material of the first prism 130 from be exposed from the junction T3, thereby reducing or preventing the (light leakage).

As shown in FIG. 1, the third reflective layer 120C is formed on the first prism 130. For example, the first prism 130 further has the third surface 130*s*3. The third reflective layer 120C is formed on the third surface 130*s*3. The first surface 130*s*1 and the third surface 130*s*3 are two adjacent or connecting surfaces of the first prism 130 respectively. In an embodiment, an included angle between the first surface 130*s*1 and the third surface 130*s*3 is, for example, 90 degrees, but it could also be greater or smaller.

As shown in FIG. 1, the first reflective layer 120A, the second reflective layer 120B and/or the third reflective layer 120C could be formed or disposed on at least one lateral surface of the first prism 130. In detail, the first reflective layer 120A, the second reflective layer 120B and/or the third reflective layer 120C are, for example, coatings coated on the first prism 130, or reflective films, reflective sheets or reflective mirrors attached to the first prism 130.

As shown in FIG. 1, the first light-splitting element 140A is, for example, a dichroic beam splitter. The first light-splitting element 140A is disposed opposite to the first light source 110A, the second light source 1108 and the third light source 110C. The first light-splitting element 140A could reflect the light having the second wavelength and the light having the third wavelength, but allow the light having the first wavelength to travel through. For example, the first light-splitting element 140A could reflect the third light L3,$_{2}$ and the fourth light L4,$_{3}$ but allow the first light L1,$_{1}$ and the second light L2,$_{1}$ to travel through. A mixed light of the first light L1,$_{1}$, the second light L2,$_{1}$, the third light L3,$_{2}$ and the fourth light L4,$_{3}$ traveling through the first light-splitting element 140A is, for example, white light.

In an embodiment, the first light L1,$_{1}$ and the second light L2,$_{1}$ are, for example, green light. Green light accounts for about 70% of white light, and the higher the proportion of green light, the higher the brightness of white light. Since the light source module 100 provides the green light with a high light-flux/a high brightness, the brightness of the white light emitted by the light source module 100 could be enhanced.

As shown in FIG. 1, the second light-splitting element 140B is, for example, a dichroic beam splitter. The second light-splitting element 140B is disposed opposite to the third light source 110C and the fourth light source 110D. The second light-splitting element 140B could reflect the light having the third wavelength, but allow the light having the second wavelength to travel through. For example, the second light-splitting element 140B could reflect the fourth light L4,$_{3}$ but allow the third light L3,$_{2}$ to travel through.

The condenser lens could condense the light emitted by the light source, so that the light traveling through the condenser lens becomes a collimated light. The condenser lens includes at least one lens which could be a spherical lens, an aspheric lens or a combination thereof.

As shown in FIG. 1, the first condenser lens 150A is disposed opposite to the first light source 110A to collimate the first light L1,$_{1}$. The first condenser lens 150A is disposed in the first axis AX1. For example, the first axis AX1 passes through the center of the first condenser lens 150A, so that the first part L1*a*,$_{1}$ and the second part L1*b*,$_{1}$ incident on the first condenser lens 150A have the substantial same amount of light relative to the first axis AX1.

As shown in FIG. 1, the second condenser lens 1506 is disposed opposite to the second light source 1106 to collimate the second light L2,$_{1}$. The second condenser lens 1506 is disposed in the second axis AX2. For example, the second axis AX2 passes through the center of the second condenser lens 150B, so that the third part L2*a*,$_{1}$ and the fourth part L2*b*,$_{1}$ incident to the second condenser lens 150B have the substantial same amount of light relative to the first axis AX1.

As shown in FIG. 1, the third condenser lens 150C is disposed opposite to the third light source 110C to collimate the third light L3,$_{2}$. The fourth condenser lens 150D is disposed opposite to the fourth light source 110D to collimate the fourth light L4,$_{3}$.

Figure 2:
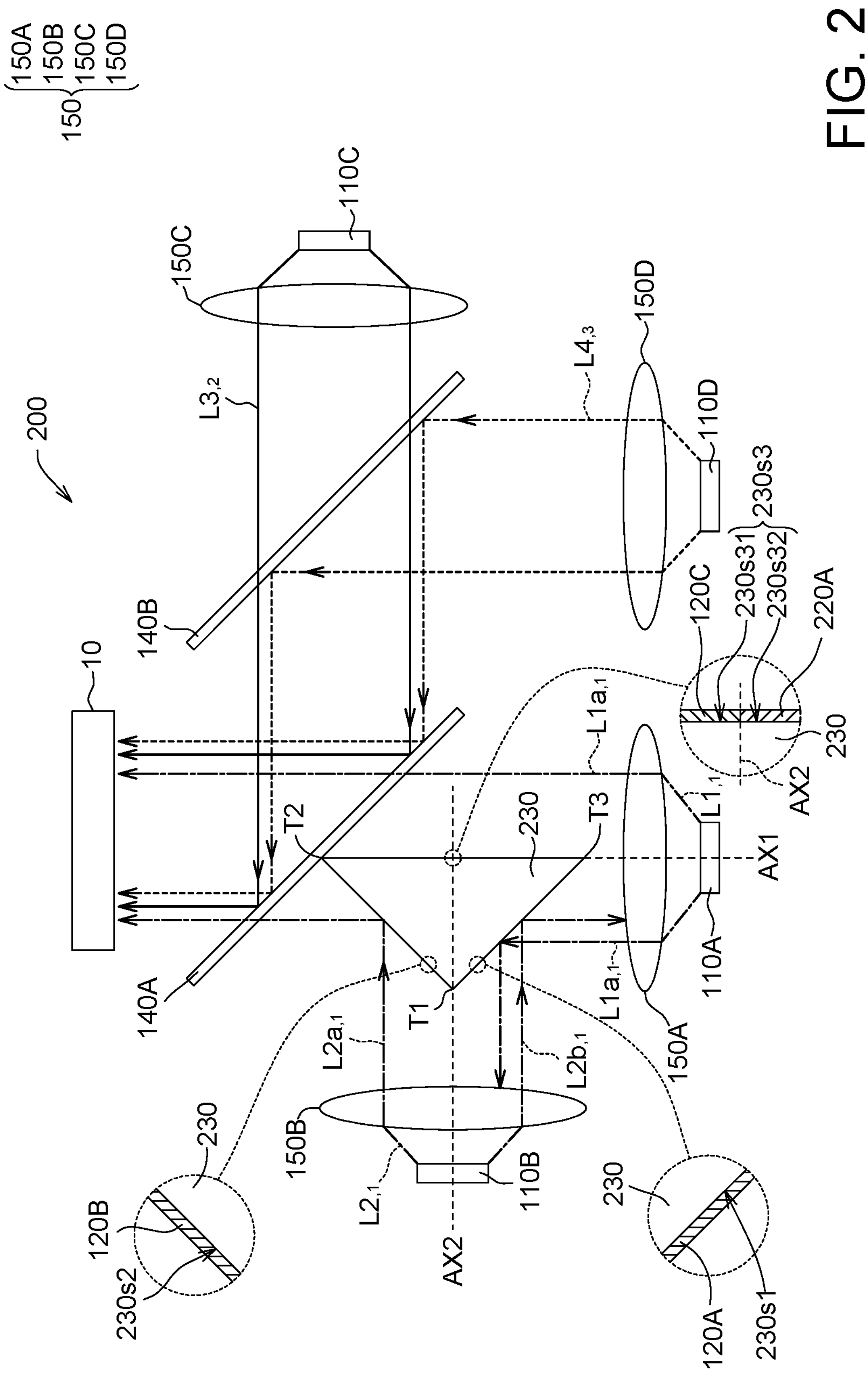
FIG. 2 shows a schematic diagram of an optical path of a light source module 200 according to another embodiment of the present invention.

Referring to FIG. 2, FIG. 2 shows a schematic diagram of an optical path of a light source module 200 according to another embodiment of the present invention. The light source module 200 could be applied to a device requiring a light source, such as a projector, illuminator, display or other types of devices. For application in the projector, the light source module 200 could also be called a light combining module.

As shown in FIG. 2, the light source module 200 includes the first light source 110A, the second light source 1106, the first reflective layer 120A, the second reflective layer 120B, the third reflective layer 120C, a first light-transmitting layer 220A, a first prism 230, the third light source 110C, the fourth light source 110D, the first light-splitting element 140A, the second light-splitting element 140B, at least one condenser lens 150 (for example, the first condenser lens 150A, the second condenser lens 150B, the third condenser lens 150C and/or or the fourth condenser lens 150D).

The light source module 200 of the present embodiment includes the structure the same as or similar to that of the aforementioned light source module 100, and difference is that, for example, the first prism 230 of the light source module 200 and the first prism 130 of the light source module 100 are different in structure.

As shown in FIG. 2, the first prism 230 has a first surface 230*s*1, the second surface 230*s*2 and a third surface 230*s*3. The first surface 230*s*1 is connected adjacent to the second surface 230*s*2, and an angle between the first surface 230*s*1 and the second surface 230*s*2 is, for example, 90 degrees, but it could also be greater or smaller. The first surface 230*s*1 is connected adjacent to the third surface 230*s*3, and an angle between the first surface 230*s*1 and the third surface 230*s*3 is, for example, 45 degrees, but it could also be greater or smaller. The second surface 230*s*2 is connected adjacent to the third surface 230*s*3, and an angle between the second surface 230*s*2 and the third surface 230*s*3 is, for example, 45 degrees, but it could also be greater or smaller.

As shown in FIG. 2, the first surface 230*s*1 and the second surface 230*s*2 are respectively located on opposite two sides of the second axis AX2. As a result, the first surface 230*s*1 could reflect the fourth part L2*b*,$_{1}$ of the second light L2,$_{1}$, and the second surface 230*s*2 could reflect the third part L2*a*,$_{1}$ of the second light L2,$_{1}$. In an embodiment, a projected area of the first surface 230*s*1 and the second surface 230*s*2 along the second axis AX2 onto the second condenser lens 150B completely (fully) overlaps with the second condenser lens 150B, and thus it could reflect the entire of the second light $L2,_1$ traveling through the second condenser lens 1508 to reduce or avoid light loss (light leakage). In addition, since the projected area of the first surface 230*s*1 and the second surface 230*s*2 along the second axis AX2 onto the second condenser lens 150B completely (fully) overlaps with the second condenser lens 150B, even if there is an assembly tolerance between the first prism 230 and other elements (for example, the second light source 110B), it will not cause light leakage (light loss). Furthermore, since the projected area of the first surface 230*s*1 and the second surface 230*s*2 along the second axis AX2 onto the second condenser lens 150B completely (fully) overlaps with the second condenser lens 150B, an assembly tolerance or a positional deviation (for example, a tolerance resulted from the assembly jig, a positional deviation of supporting points in the light source module, manual errors of assemblers, etc.) between the first prism 230 and other elements (for example, the second light source 1108) is allowed.

As shown in FIG. 2, the third surface 230*s*3 includes a first surface portion 230*s*31 and a second surface portion 230*s*32. The second axis AX2, for example, passes through a boundary between the first surface portion 230*s*31 and the second surface portion 230*s*32, that is, the first surface portion 230*s*31 and the second surface portion 230*s*32 are respectively located on two opposite sides of the second axis AX2. The third reflective layer 120C is formed on the first surface portion 230*s*31 of the third surface 230*s*3. The first light-transmitting layer 220A is formed on the second surface portion 230*s*32 of the third surface 230*s*3. Compared with the second surface portion 230*s*32, the probability or proportion of the first part $L1a,_1$ of the first light $L1,_1$ incident on the first surface portion 230*s*31 is higher, and thus the third reflective layer 120C may be formed on the first surface portion 230*s*31 for reflecting the first part $L1a,_1$, while the first light-transmitting layer 220A or a reflective layer (for example, another third reflective layer 120C) may be optionally formed on the second surface portion 230*s*32.

As shown in FIG. 2, since the prism 230, the first reflective layer 120A, the second reflective layer 1208, the third reflective layer 120C and the first light-transmitting layer 220A form an integral structure, and thus they could move together. As a result, it is convenient to be assembled in the light path space of the light source module 200. In addition, the first reflective layer 120A and the second reflective layer 1208 could be connected to each other at the junction T1 between the first surface 230*s*1 and the second surface 230*s*2 of the first prism 230, and thus it could prevent a physical light-transmitting material of the first prism 230 from be exposed from the junction T1, thereby preventing the second light $L2,_1$ from traveling the first prism 230 to become light leakage (light loss). Similarly, the second reflective layer 1208 and the third reflective layer 120C could be connected to each other at the junction T2 between the second surface 230*s*2 and the third surface 230*s*3 of the first prism 230, and thus it could prevent the physical light-transmitting material of the first prism 230 from be exposed from the junction T2, thereby reducing or preventing the (light leakage). Similarly, the first reflective layer 120A and the first light-transmitting layer 220A could be connected to each other at the junction T3 between the first surface 230*s*1 and the third surface 230*s*3 of the first prism 230, and thus it could prevent the physical light-transmitting material of the first prism 230 from be exposed from the junction T3, thereby reducing or preventing the (light leakage). The method of forming the first light-transmitting layer 220A on the prism may be the same as or similar to that of the first reflective layer 120A, the second reflective layer 120B, and/or the third reflective layer 120C, and it will not be repeated here.

Figure 3:
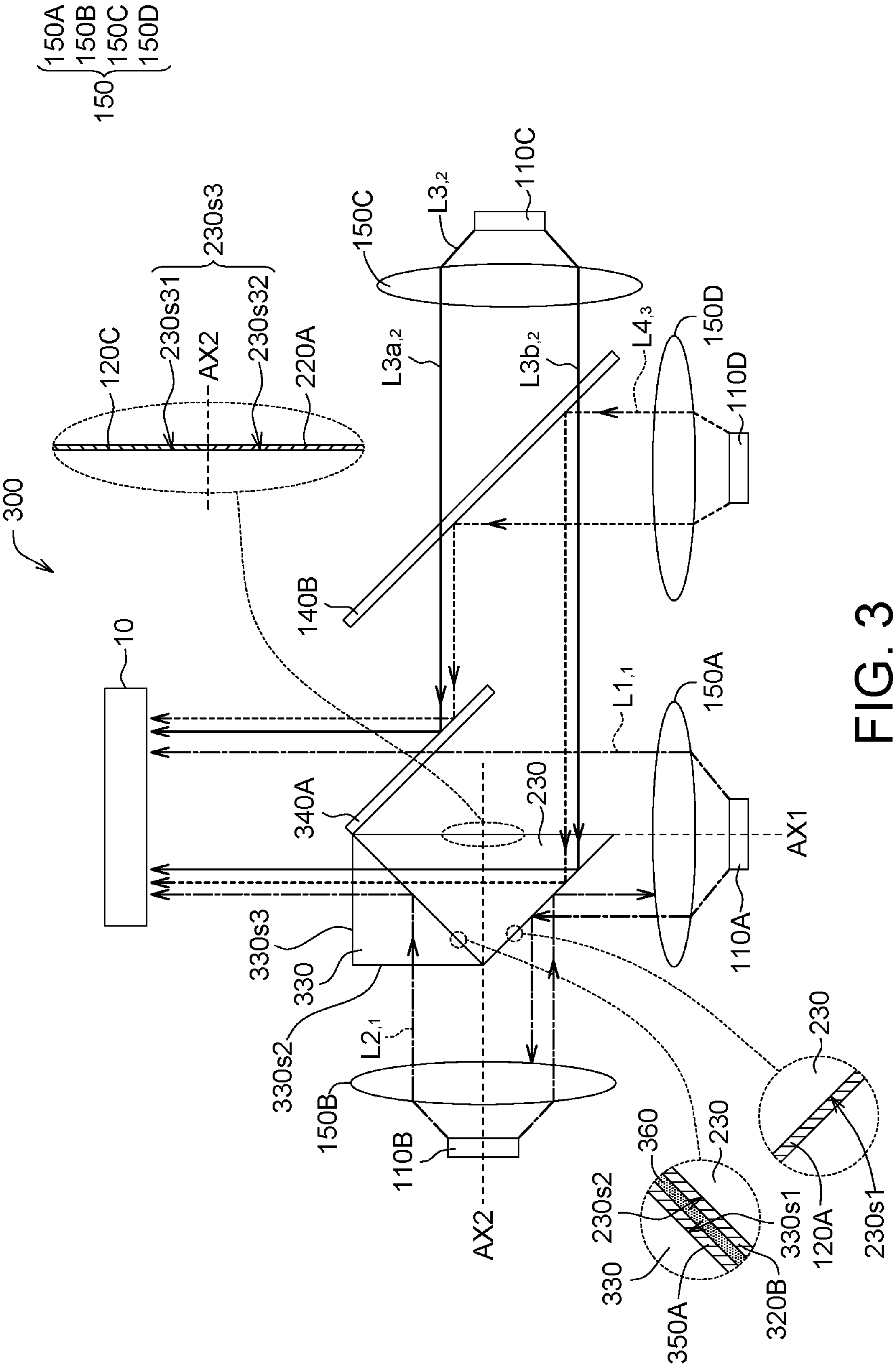
FIG. 3 shows a schematic diagram of an optical path of a light source module 300 according to another embodiment of the present invention.

Referring to FIG. 3, FIG. 3 shows a schematic diagram of an optical path of a light source module 300 according to another embodiment of the present invention. The light source module 300 could be applied to a device requiring a light source, such as a projector, illuminator, display or other types of devices. For application in the projector, the light source module 300 could also be called a light combining module.

As shown in FIG. 3, the light source module 300 includes the first light source 110A, the second light source 1108, the third light source 110C, the fourth light source 110D, the first reflective layer 120A, the second reflective layer 120B, the third reflective layer 120C, the second light-splitting element 140B, at least one condenser lens 150 (for example, the first condenser lens 150A, the second condenser lens 150B, the third condenser lens 150C and/or the fourth condenser lens 150D), the first light-transmitting layer 220A, the first prism 230 (light-transmitting element), a light-splitting layer 320B, anti-reflective layer 350A, a second prism 330, a first light-splitting element 340A and an adhesive (or glue) layer 360.

As shown in FIG. 3, the first light source 110A is configured to emit the first light $L1,_1$ having the first wavelength. The second light source 1106 is configured to emit the second light $L2,_1$ having the first wavelength. The first prism 230 has the first surface 230*s*1 and the second surface 230*s*2. The first reflective layer 120A is formed on the first surface 230*s*1 and is configured to reflect the first light $L1,_1$. The light-splitting layer 320B is formed adjacent to the second surface 230*s*2 and configured to reflect the second light $L2,_1$. In addition, compared with the light source module 200, the second light-splitting element 1406 and the third light source 110C of the light source module 300 are located closer to the fourth light source 110D, and thus it could shorten the length of the optical path of the fourth light $L4,_3$.

As shown in FIG. 3, the light-splitting layer 320B allows the light having the second wavelength and the light having the third wavelength to travel through. For example, the light-splitting layer 320B allows the third light $L3,_2$ and the fourth light $L4,_3$ to travel through. The light-splitting layer 320B is formed between two opposite surfaces of the first prism 130 and the second prism 330. For example, the second prism 330 has a fourth surface 330*s*1, the fourth surface 330*s*1 of the second prism 330 is opposite to the second surface 230*s*2 of the first prism 230, and the light-splitting layer 320B could be pre-formed on the fourth surface 330*s*1 of the second prism 330 or pre-formed on the second surface 230*s*2 of the first prism 230.

As shown in FIG. 3, the second prism 330 is connected adjacent to the first prism 230. For example, the adhesive layer 360 may be formed between the fourth surface 330*s*1 of the second prism 330 and the second surface 230*s*2 of the first prism 230 to bond the second prism 330 and the first prism 230. There is no air layer in the space between the two opposite surfaces of the second prism 330 and the first prism 230, and thus it could avoid light loss caused by excessive deflection of light. For example, space between the fourth surface 330*s*1 of the second prism 330 and the second surface 230*s*2 of the first prism 230 is filled with the light-splitting layer 320B, the adhesive layer 360 and the anti-reflective layer 350A. In an embodiment, the first prism 230 has a first refraction index, the second prism 330 has a second refraction index, the adhesive layer 360 has a third refraction index, wherein the first refraction index, the second refraction index and the third refraction index are substantially equal to avoid light loss caused by excessive deflection of light.

As shown in FIG. 3, the anti-reflective layer 350A could be formed on the fourth surface 330*s*1 of the second prism 330. The anti-reflective layer 350A has a light transmittance of at least 95%. The method of forming the anti-reflective layer 350A on the prism may be the same as or similar to that of the first reflective layer 120A, the second reflective layer 120B and/or the third reflective layer 120C, and it will not be repeated here.

As shown in FIG. 3, the second prism 330 further has a fifth surface 330*s*2 and a sixth surface 330*s*3, wherein the fifth surface 330*s*2 is adjacent to or connected to the sixth surface 330*s*3, and an included angle between the fifth surface 330*s*2 and the sixth surface 330*s*3 is, for example, 90° degree, but could also be greater or smaller. Although not shown, the light source module 300 further includes two anti-reflective layers, and the two anti-reflective layers are formed on the fifth surface 330*s*2 and the sixth surface 330*s*3 respectively.

As shown in FIG. 3, in the present embodiment, the second axis AX2 further passes through a light-emitting surface of the third light source 110C. The third light $L3_{,2}$ includes a fifth part $L3a_{,2}$ and a sixth part $L3b_{,2}$. The fifth part $L3a_{,2}$ and the sixth part $L3b_{,2}$ travel along two opposite sides of the second axis AX2 respectively. The first light-splitting element 340A is disposed on a side of the second axis AX2. The fifth part $L3a_{,2}$ is incident to the first light-splitting element 340A after traveling through the second light-splitting element 1408, and then reflects from the first light-splitting element 340A to the module 10. The sixth part $L3b_{,2}$ is incident to the first reflective layer 120A after traveling through the second light-splitting element 140B, and then reflects from the first reflective layer 120A to the module 10.

Figure 4:
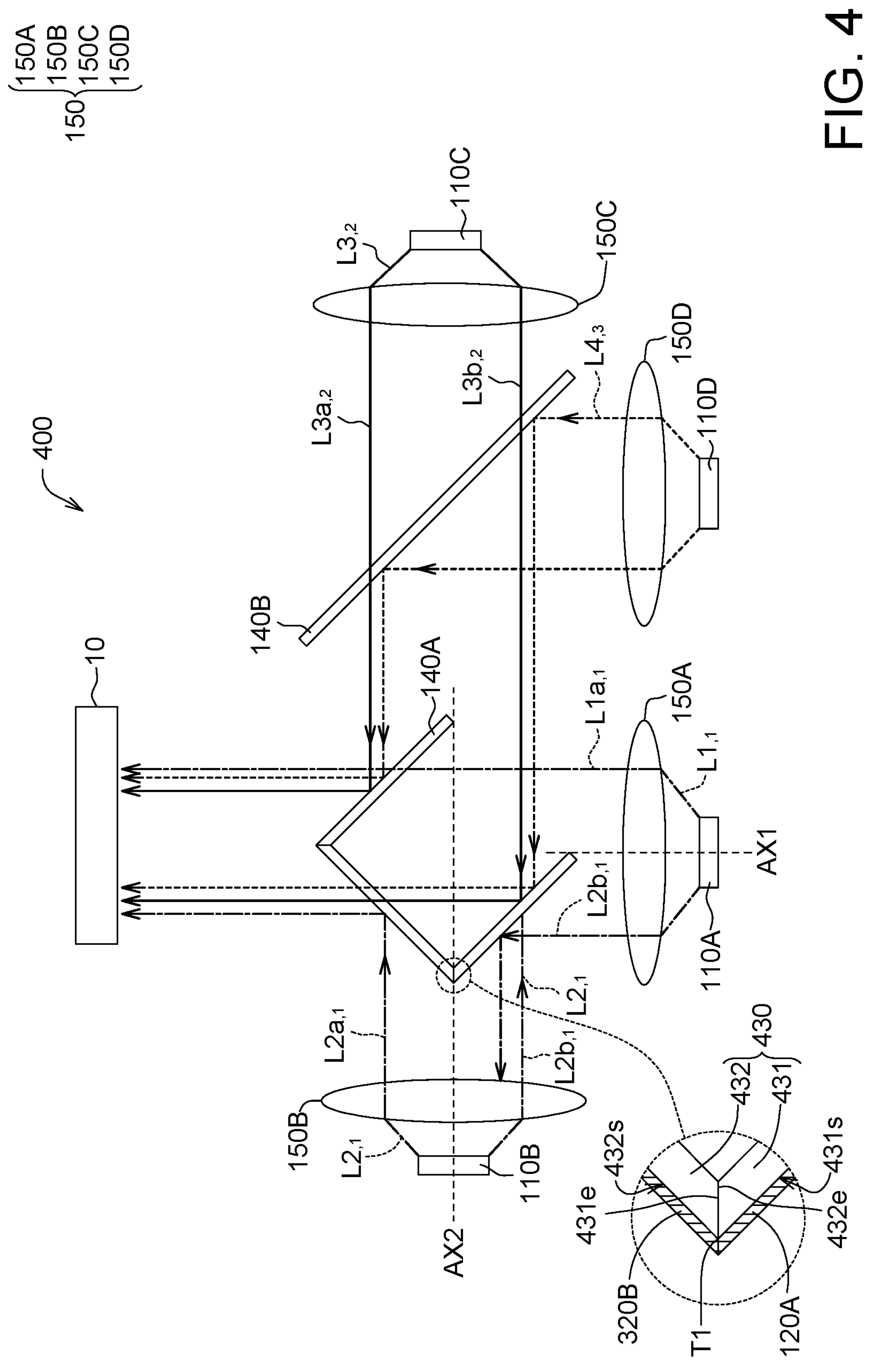
FIG. 4 shows a schematic diagram of an optical path of a light source module 400 according to another embodiment of the present invention.

Referring to FIG. 4, FIG. 4 shows a schematic diagram of an optical path of a light source module 400 according to another embodiment of the present invention. The light source module 400 could be applied to a device requiring a light source, such as a projector, illuminator, display or other types of devices. For application in the projector, the light source module 400 could also be called a light combining module.

As shown in FIG. 4, the light source module 400 includes the first light source 110A, the second light source 1108, the first reflective layer 120A, a light-transmitting element 430, the third light source 110C, the fourth light source 110D and the first light-splitting element 140A, the second light-splitting element 140B, at least one condenser lens 150 (for example, the first condenser lens 150A, the second condenser lens 150B, the third condenser lens 150C and/or the fourth condenser lens 150D) and the light-splitting layer 320B.

As shown in FIG. 4, the light-transmitting element 430 includes a first light-transmitting plate 431 and a second light-transmitting plate 432, wherein the first light-transmitting plate 431 has a first surface 431*s*, the second light-transmitting plate 432 has a second surface 432*s*, and an angle between the first light-transmitting plate 431 and the second light-transmitting plate 432 is, for example, 90 degrees, but it could also be greater or smaller. In addition, the first light-transmitting plate 431 and the second light-transmitting plate 432 may be integrally formed, or connected together after formed separately.

As shown in FIG. 4, the first light-transmitting plate 431 has an end surface 431*e*, and the second light-transmitting plate 432 has an end surface 432*e*, wherein the end surface 431*e* is connected to the end surface 432*e*. The first reflective layer 120A is formed on the first surface 431*s* of the first light-transmitting plate 431. The light-splitting layer 320B is formed on the second surface 432*s* of the second light-transmitting plate 432. In the present embodiment, the first reflective layer 120A and the light-splitting layer 320B are connected at a junction T1 between the first surface 431*s* and the second surface 432*s*, and thus it could prevent a physical light-transmitting material of the first light-transmitting plate 431 and a physical light-transmitting material of the second light-transmitting plate 432 from be exposed from the junction T1, thereby reducing or preventing the (light leakage). In addition, the second light-transmitting plate 432 and the first light-splitting element 140A have the connection features similar to or the same as that the first light-transmitting plate 431 and the second light-transmitting plate 432, and it will not be repeated here. The light-splitting layer 320B could extend to the junction T2 between the second light-transmitting plate 432 and the first light-splitting element 140A, and it could reduce or avoid light loss (light leakage).

As shown in FIG. 4, the light-transmitting element 430, the first reflective layer 120A and the light-splitting layer 320B could be an integral structure, and thus they could move together. As a result, it is convenient to be assembled in the light path space of the light source module 400. In an embodiment, the light-transmitting element 430, the first reflective layer 120A, the light-splitting layer 320B and the first light-splitting element 140A could be an integral structure, and thus they could move together. As a result, it is convenient to be assembled in the light path space of the light source module 400.

To sum up, the embodiment of the present invention proposes a light source module. In an embodiment, the light source module includes at least one light source and at least one reflective layer. Each light source could emit light of a first wavelength, and the reflective layer could reflect the light of the first wavelength back to the light source to recycling and reuse for the light of the wavelength, thereby reducing light loss and/or enhancing the brightness of light output.

It will be apparent to those skilled in the art that various modifications and variations could be made to the disclosed embodiments. It is intended that the specification and examples be considered as exemplary only, with a true scope of the disclosure being indicated by the following claims and their equivalents.

What is claimed is:

1. A light source module, comprising: a first light source configured to emit a first light having a first wavelength; a second light source configured to emit a second light having the first wavelength; a first reflective layer disposed opposite to the first light source and configured to reflect the first light; and a second reflective layer disposed opposite to the second light source and configured to reflect the second light; the first reflective layer and the second reflective layer are configured to reflect light of any wavelength in a visible spectrum; a first prism having a first surface and a second surface; the first reflective layer is formed on the first surface, and the second reflective layer is formed on the second surface and a reflective element disposed opposite to the second light source; wherein the first prism and the reflective element are disposed on two opposite sides of an axis respectively, and the axis passes through a light-emitting surface of the second light source.

2. The light source module as claimed in claim 1, wherein an angle between the first surface and the second surface is 45 degrees.

3. The light source module as claimed in claim 1, wherein the first prism is disposed on a side of an axis, and the axis passes through a light-emitting surface of the first light source.

4. The light source module as claimed in claim 1, further comprising:

a third light source configured to emit a third light with a second wavelength;

a first light-splitting element disposed opposite to the first light source, the second light source and the third light source;

wherein the first light-splitting element is configured to reflect the third light but allow the first light and the second light to travel through.

5. The light source module as claimed in claim 1, wherein an angle between the first surface and the second surface is 90 degrees.

6. The light source module as claimed in claim 4 further comprising:

a fourth light source configured to emit a fourth light having a third wavelength;

a second light-splitting element disposed opposite to the third light source and the fourth light source;

wherein the second light-splitting element is configured to reflect the fourth light but allow the third light to travel through.

7. The light source module as claimed in claim 5, further comprising:

a fourth light source configured to emit a fourth light having a third wavelength;

a second light-splitting element disposed opposite to the third light source and the fourth light source;

wherein the second light-splitting element is configured to reflect the fourth light but allow the third light to travel through.

* * * * *